US011354475B2

(12) United States Patent
Geada et al.

(10) Patent No.: US 11,354,475 B2
(45) Date of Patent: *Jun. 7, 2022

(54) SYSTEMS AND METHODS FOR ACCURATE VOLTAGE IMPACT ON INTEGRATED TIMING SIMULATION

(71) Applicant: ANSYS, Inc., Canonsburg, PA (US)

(72) Inventors: Joao Moreno Geada, Chelmsford, MA (US); Nicholas Lee Rethman, North Andover, MA (US); Ankur Gupta, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,508

(22) Filed: Nov. 4, 2020

(65) Prior Publication Data
US 2021/0056248 A1 Feb. 25, 2021

Related U.S. Application Data

(63) Continuation of application No. 16/288,435, filed on Feb. 28, 2019, now Pat. No. 10,839,123.

(60) Provisional application No. 62/713,729, filed on Aug. 2, 2018.

(51) Int. Cl.
G06F 30/367 (2020.01)
G06F 30/3312 (2020.01)
G06F 30/36 (2020.01)
G06F 119/06 (2020.01)
G06F 119/12 (2020.01)

(52) U.S. Cl.
CPC .......... *G06F 30/3312* (2020.01); *G06F 30/36* (2020.01); *G06F 2119/06* (2020.01); *G06F 2119/12* (2020.01)

(58) Field of Classification Search
CPC .. G06F 30/3312; G06F 30/36; G06F 2119/06; G06F 2119/12; G06F 30/367
See application file for complete search history.

(56) References Cited

U.S. PATENT DOCUMENTS

| 7,310,792 | B2* | 12/2007 | Verghese | G06F 30/3312 716/113 |
| 10,430,537 | B2* | 10/2019 | Jung | G06F 30/30 |
| 2008/0244488 | A1* | 10/2008 | Okumura | G06F 30/3312 716/113 |

* cited by examiner

Primary Examiner — Nghia M Doan
(74) Attorney, Agent, or Firm — Jones Day

(57) ABSTRACT

Systems and methods are provided for simulating an integrated circuit system. A file representative of an integrated circuit layout is received, the integrated circuit layout including a plurality of cells and characteristics of power supply and ground paths to each cell. A vulnerable cell of the integrated circuit layout based on a vulnerability characteristic of the vulnerable cell. A power analysis of a portion of the integrated circuit layout is performed to determine a plurality of power and ground levels within a timing window for each of a plurality of cells including the vulnerable cell. A timing analysis of the vulnerable cell is performed, where the timing analysis receives a single power level and single ground level for the vulnerable cell and determines a slack level for the vulnerable cell. An at risk path is identified based on the vulnerable cell slack level, and a dynamic power/ground simulation of one or more cells in the at risk path is performed.

20 Claims, 10 Drawing Sheets

US 11,354,475 B2

SYSTEMS AND METHODS FOR ACCURATE VOLTAGE IMPACT ON INTEGRATED TIMING SIMULATION

CROSS-REFERENCE TO RELATED APPLICATIONS

This application claims priority to U.S. application Ser. No. 16/288,435, entitled "SYSTEMS AND METHODS FOR ACCURATE VOLTAGE IMPACT ON INTEGRATED TIMING SIMULATION", filed Feb. 28, 2019, which claims the priority of U.S. Provisional Application No. 62/713,729, entitled "SYSTEMS AND METHODS FOR ACCURATE VOLTAGE IMPACT ON TIMING CALCULATION IN STATIC TIMING ANALYSIS," filed Aug. 2, 2018, both of which are herein incorporated by reference in their entirety.

BACKGROUND

In electronic circuit designs, cells are basic units of functionality. A cell in the context of electronic design automation (EDA) is an abstract representation of a component within a schematic diagram or physical layout of an electronic circuit in software. An integrated circuit (IC) may comprise many thousands, millions, or even billions of cells that interact to create the desired functionality of the IC. During IC design or post-design review/troubleshooting, it is often desirable to analyze the traversal of signals amongst the IC design cells to verify that the IC will behave as intended.

IC simulation techniques can provide highly accurate representations of both intra- and inter-cell behaviors of IC cells. For example, one of the commercially available SPICE simulators can precisely obtain the behavior of a group of IC cells (e.g., along a path of cells within the IC) based on a given set of inputs (e.g., an input vector) and dynamic power supply and ground signal values experienced by the IC cells. But such dynamic simulations can be time and resource intensive, taking minutes, hours, or longer to complete. The multitude of possible input vectors to an IC combined with the millions or billions of cells that may be present in an IC design typically makes full, dynamic simulation of a design infeasible.

SUMMARY

Systems and methods are provided for simulating an integrated circuit system. A file representative of an integrated circuit layout is received, the integrated circuit layout including a plurality of cells and characteristics of power supply and ground paths to each cell. A vulnerable cell of the integrated circuit layout is determined based on a vulnerability characteristic of the vulnerable cell. A power analysis of a portion of the integrated circuit layout is performed to determine a plurality of power and ground levels within a timing window for each of a plurality of cells including the vulnerable cell. A timing analysis of the vulnerable cell is performed, where the timing analysis receives a single power level and single power level and single ground level for the vulnerable cell and determines a slack level for the vulnerable cell. An at risk path is identified based on the vulnerable cell slack level, and a dynamic power/ground simulation of one or more cells in the at risk path is performed.

As another example, a computer-implemented system for simulating an integrated circuit system includes one or more data processors and a computer-readable medium encoded with instructions for commanding one or more data processors to execute steps of a method. In the method, a file representative of an integrated circuit layout is received, the integrated circuit layout including a plurality of cells and characteristics of power supply and ground paths to each cell. A vulnerable cell of the integrated circuit layout is determined based on a vulnerability characteristic of the vulnerable cell. A power analysis of a portion of the integrated circuit layout is performed to determine a plurality of power and ground levels within a timing window for each of a plurality of cells including the vulnerable cell. A timing analysis of the vulnerable cell is performed, where the timing analysis receives a single power level and single ground level for the vulnerable cell and determines a slack level for the vulnerable cell. An at risk path is identified based on the vulnerable cell slack level, and a dynamic power/ground simulation of one or more cells in the at risk path is performed.

DETAILED DESCRIPTION

Figure 1:
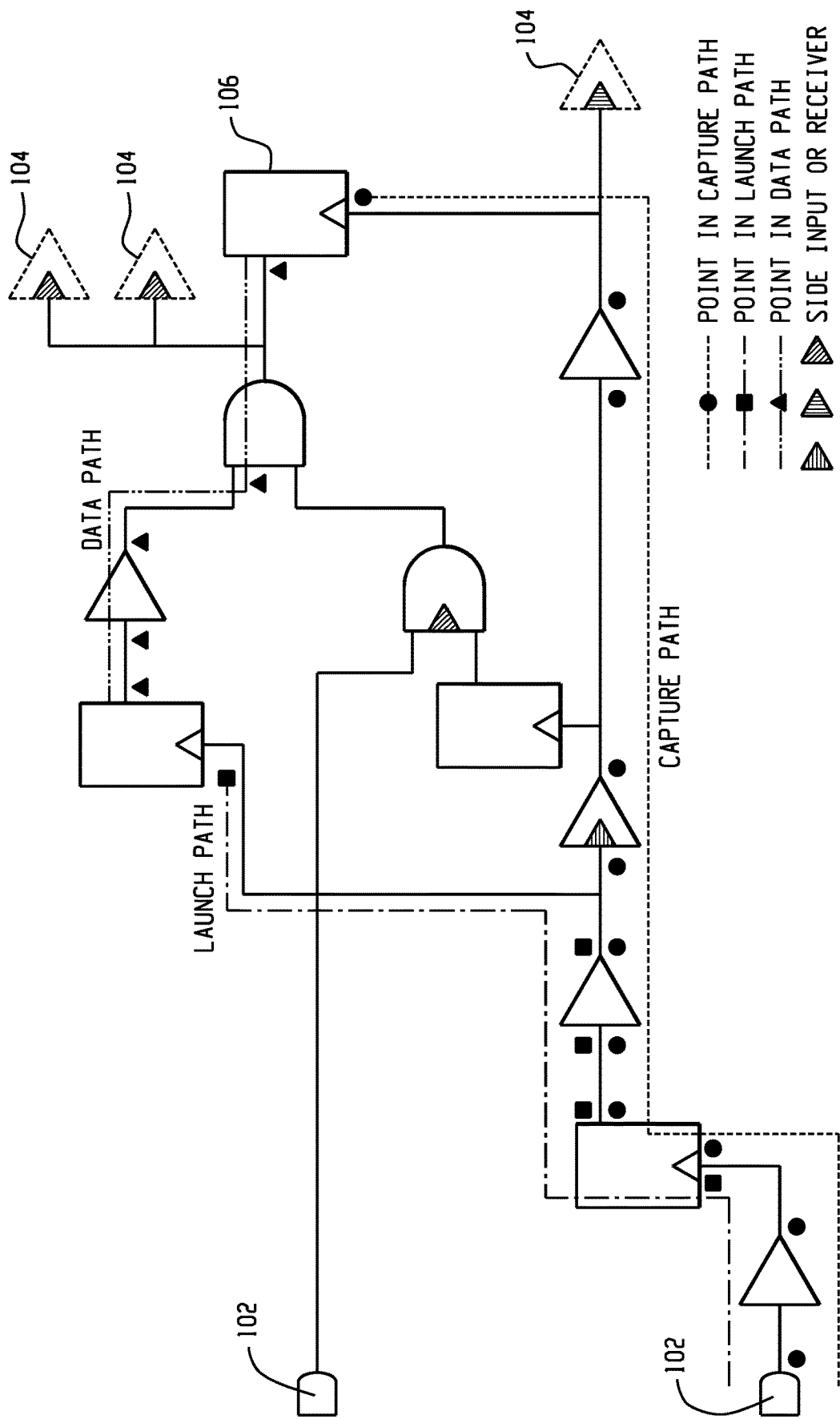
FIG. 1 is a block diagram depicting a portion of cells of an integrated circuit design.

FIG. 1 is a block diagram depicting a portion of cells of an integrated circuit design. The example of FIG. 1 includes fourteen cells that propagate signals and provide logic operations from two input nodes 102 to three output nodes 104. As noted above, a typical IC may have up to a billion or more cells. The example of FIG. 1 includes three identified paths through the IC having different numbers of cells along the paths (e.g., the Launch Path includes four cells, the Data Path includes three cells, and the Capture Path includes six cells). In order for the depicted IC to function properly, coordination of arrival of signals along the depicted paths may be important. For example, it may be important that a signal traversing the Capture Path arrive at cell 106 within a certain amount of time as a signal traversing the Launch Path and the Data Path.

Figure 2:
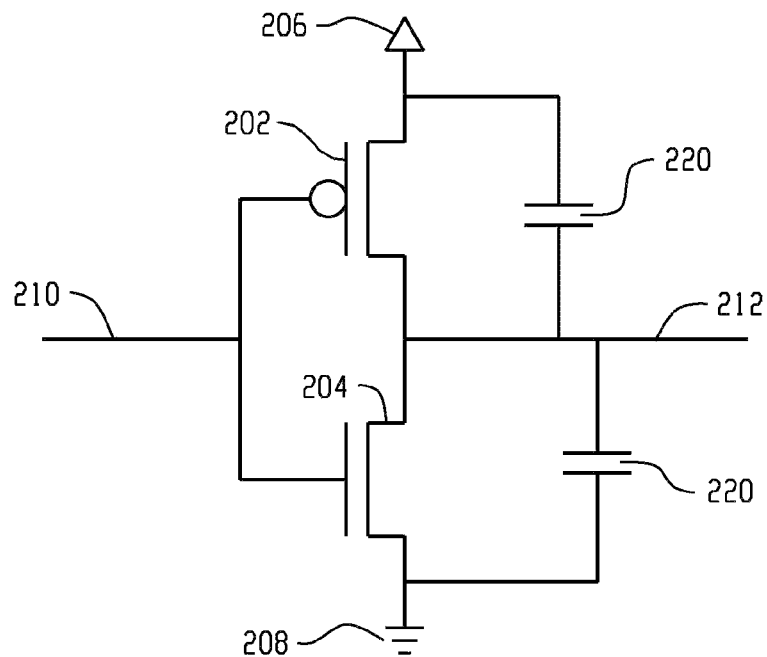
FIG. 2 depicts an example IC cell where a dynamic power signal level affects cell timing.
Figure 2:
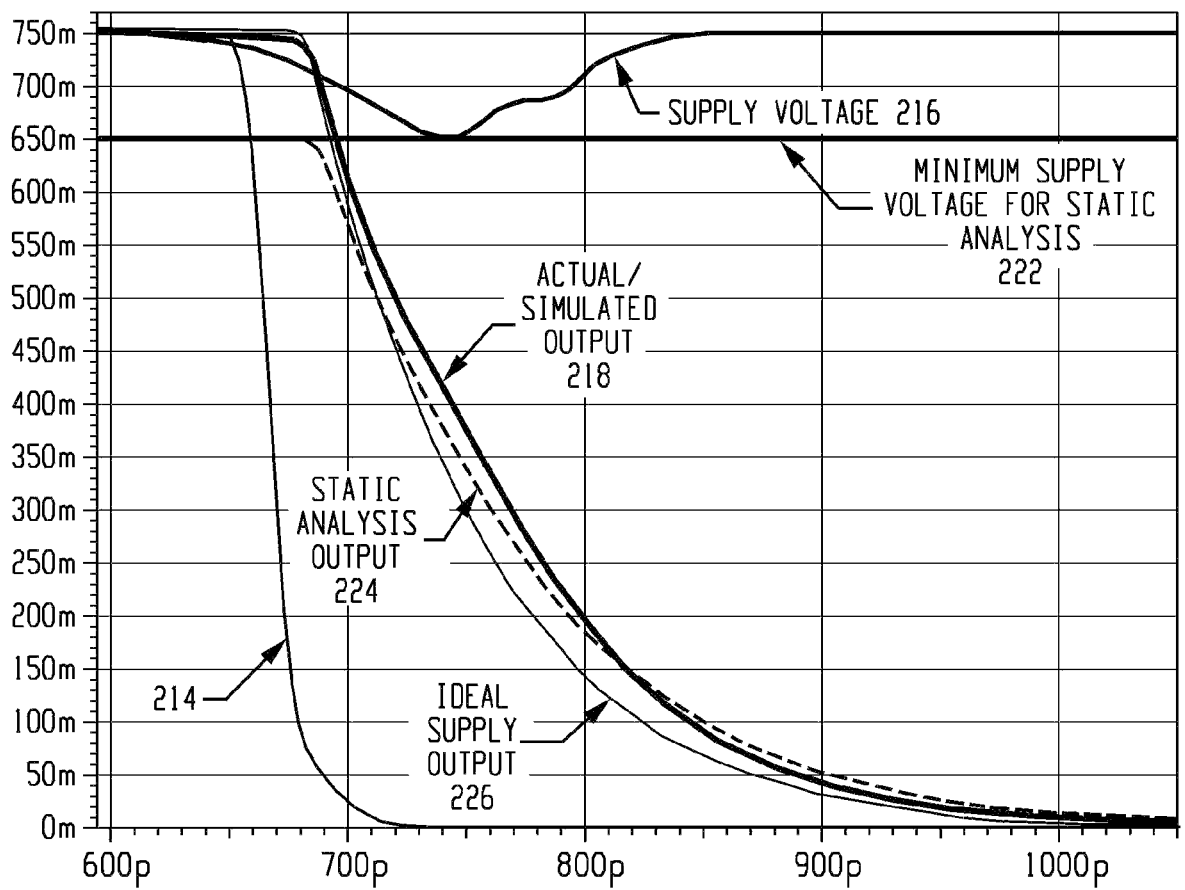

A cell's operation may be affected by power and ground signal levels, which may be dynamic (change) through the course of a timing window (a discrete period of time during which inputs to a cell are relevant to operation of that cell). FIG. 2 depicts an example IC cell where a dynamic power signal level affects cell timing. In the example of FIG. 2, a cell comprises two transistors 202, 204 positioned between a power node 206 and a ground node 208 between an input node 210 and an output node. As designed, the cell is configured to transition its output node signal 212 as depicted at 214 (e.g., upon a change of a signal level at input node 210 from a zero logic level to a one logic level). But a dynamic, temporary drop in the supply voltage at node 206 caused by capacitive coupling 220 between the power node 206 and the ground node 208, depicted at 216, at the start of the output node signal 212 transition, results in the actual transition 218, as would occur in the real world and as would be detected via dynamic simulation, occurring later in time than designed. Such a delay could result in a reduction of slack (e.g., a difference in when signals in a path are calculated to arrive at a cell compared to when those signals must arrive at the cell to ensure proper operation of the cell) along a path, possibly enough that a signal would not reach a destination cell in time for the path to perform as designed (e.g., the path would have negative slack).

Confirmation of such timing across a full range of input signal combinations (input vectors) provided in FIG. 1 at 102 and likely dynamic power and ground signals is possible and beneficial in instances where path timing is close (e.g., where path slack is near zero). But such dynamic simulation is resource intensive. Because full dynamic simulation of IC cells and their interactions is typically too resource and time intensive to be used across an entirety of design, verification, and troubleshooting of an IC, certain techniques have been developed to approximate the behavior of IC cells in a less resource intensive fashion. Techniques, such as static timing analysis, provide fast computation of timing behavior of an individual cell of an IC design through simplification of a model of the cell to be analyzed and/or the inputs to that cell model. For example, in some implementations, a static timing analysis considers only a single, constant signal level for inputs to a cell, such as input signals and power supply/ground signals. The "static" portion of that analysis's name comes from the fact that only a single signal value (e.g., a single value representative of both power and ground signals provided to the cell) is considered by the analysis, where dynamic simulation methods may consider variations on those waveforms throughout a timing window. Static timing analysis techniques often calculate path slack or voltage sensitivity (e.g., a change in cell delay of the cell based on a corresponding supply voltage change). In the example of FIG. 2, the actual transmission waveform, replicated by dynamic simulation, is illustrated at 218. The waveform that is determined using a static timing analysis technique is illustrated at 224, where that technique utilizes a supply voltage 222 at the lowest point of the point of supply voltage signal 216, illustrating the inaccuracy of a static technique 224 versus a dynamic simulation technique 218. Line 226 illustrates timing if no supply voltage drop was experienced (i.e., an output for an ideal power supply).

Static timing analysis techniques are typically very resource and time efficient, but their failure to consider dynamic variations in input signal and/or power and ground inputs results in a loss in accuracy over dynamic simulation techniques. In order to compensate for those accuracy deficiencies, an IC designer may adjust the circuit by adding margin to ensure that the IC functions as intended. For example, if a static timing analysis indicates that a cell path has 0.2 ns of slack, and the static timing analysis is understood to be accurate within 0.4 ns, the IC designer may add margin into the cell path (e.g., by removing one or more buffers or otherwise adjusting cells along that path) to increase the cell path slack by 0.3 ns to 0.5 ns to ensure proper circuit behavior, even in the face of worst-case behavior by the static timing analysis. While such an "adjustment factor" can be used to ensure that the IC behaves properly, it is a sub-optimal solution in instances where the static timing analysis calculation is pessimistic. In those instances, the "adjustment factor" results in incorporation of unnecessary margin into the IC design, which adversely affects circuit performance and cost.

Systems and methods as described herein provide targeted utilization of dynamic simulation techniques in IC design, verification, and revision. It has been discovered that losses in accuracy in static analysis techniques (e.g., static timing analysis techniques that consider only a single signal value representative of both power and ground voltages) can be significant in instances where power supply and ground inputs to an IC cell vary within the timing window. Systems and methods as described herein identify cell paths where accuracy of static timing analysis techniques may exhibit worst-case or near-worst-case estimation behavior, such as based on dynamic power and ground signal behaviors. Cell paths that contain cells that are vulnerable (i.e., vulnerable cells) to such dynamic power and ground signal fluctuations are candidates for more robust simulation techniques (e.g., a DvD technique) to more accurately determine slack or voltage sensitivities at those vulnerable cells. By increasing accuracy of the timing analysis at those vulnerable cells, the expected accuracy of the overall timing analysis procedure improves (e.g., from 0.4 ns to 0.2 ns), reducing the need to adjust the IC design to incorporate unnecessary margin to account for worst-case static timing analysis accuracy.

Figure 3:
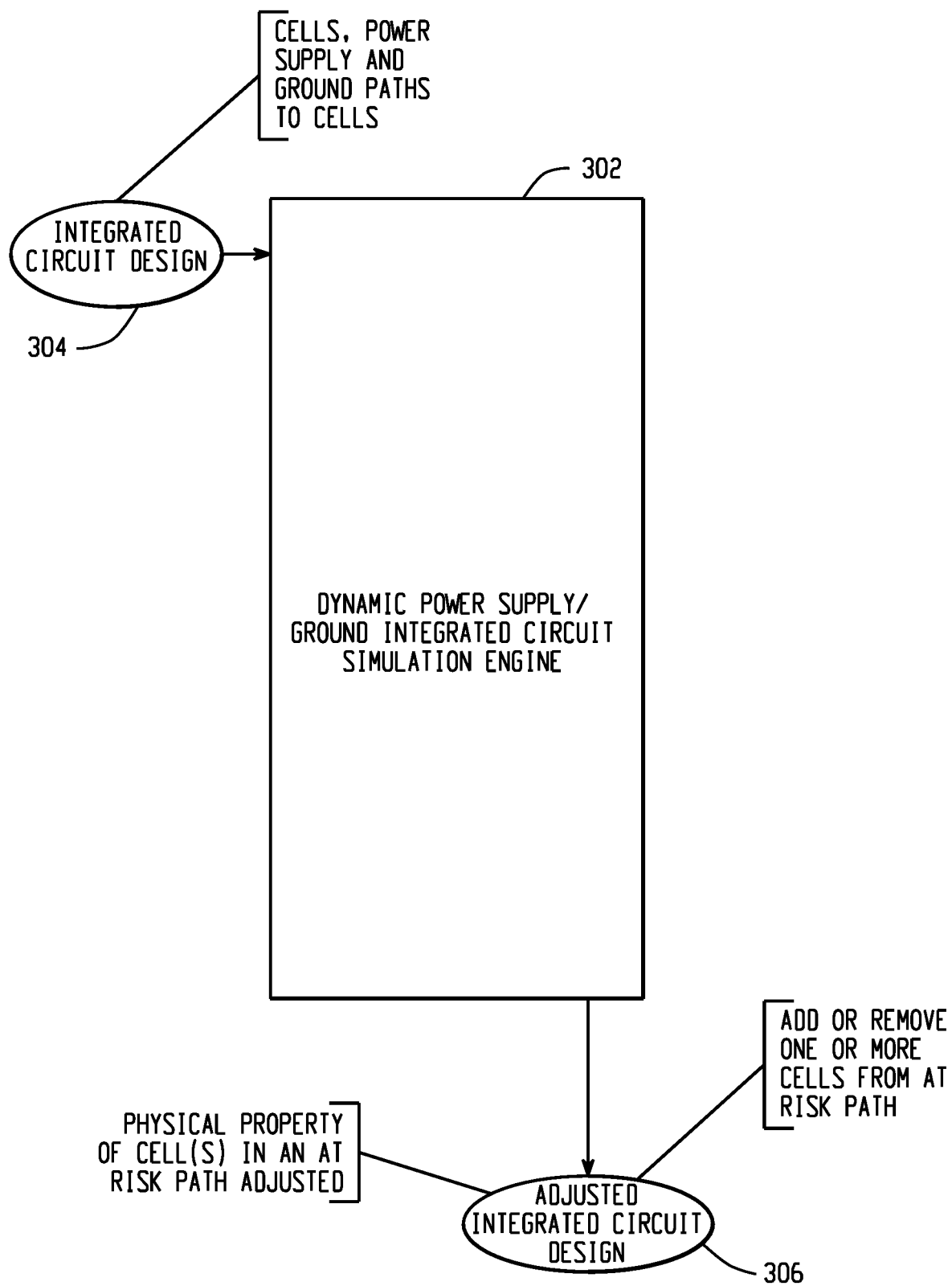
FIG. 3 is a diagram depicting a processor-implemented integrated circuit simulation engine.

FIG. 3 is a diagram depicting a processor-implemented integrated circuit simulation engine. A dynamic power supply/ground integrated circuit simulation engine 302 receives an integrated circuit design 304. That IC design 304 may take the form of a data file representative of an integrated circuit layout that includes a plurality of cells and characteristics of power supply and ground paths to each cell (e.g., lengths of power supply and ground paths, width of power supply and ground paths, a number of cells on associated power supply and ground paths, and types of cells on associated power supply and ground paths). The simulation engine 302 analyzes timing characteristics of paths of cells of the IC design, performing dynamic power/ground simulation of one or more cells of the IC design 304, but fewer than all of the cells of the IC design 304. Based on that analysis, the simulation engine 302 automatically, or with the aid of input from an IC designer provides an adjusted integrated circuit layout 306. For example, the adjusted IC layout may incorporate addition or deletion of buffer cells, adjustment of physical characteristics of power supply and ground paths within the circuit, or other changes to improve circuit performance or margins (e.g., increasing path slack to be at a zero level or above).

Figure 4:
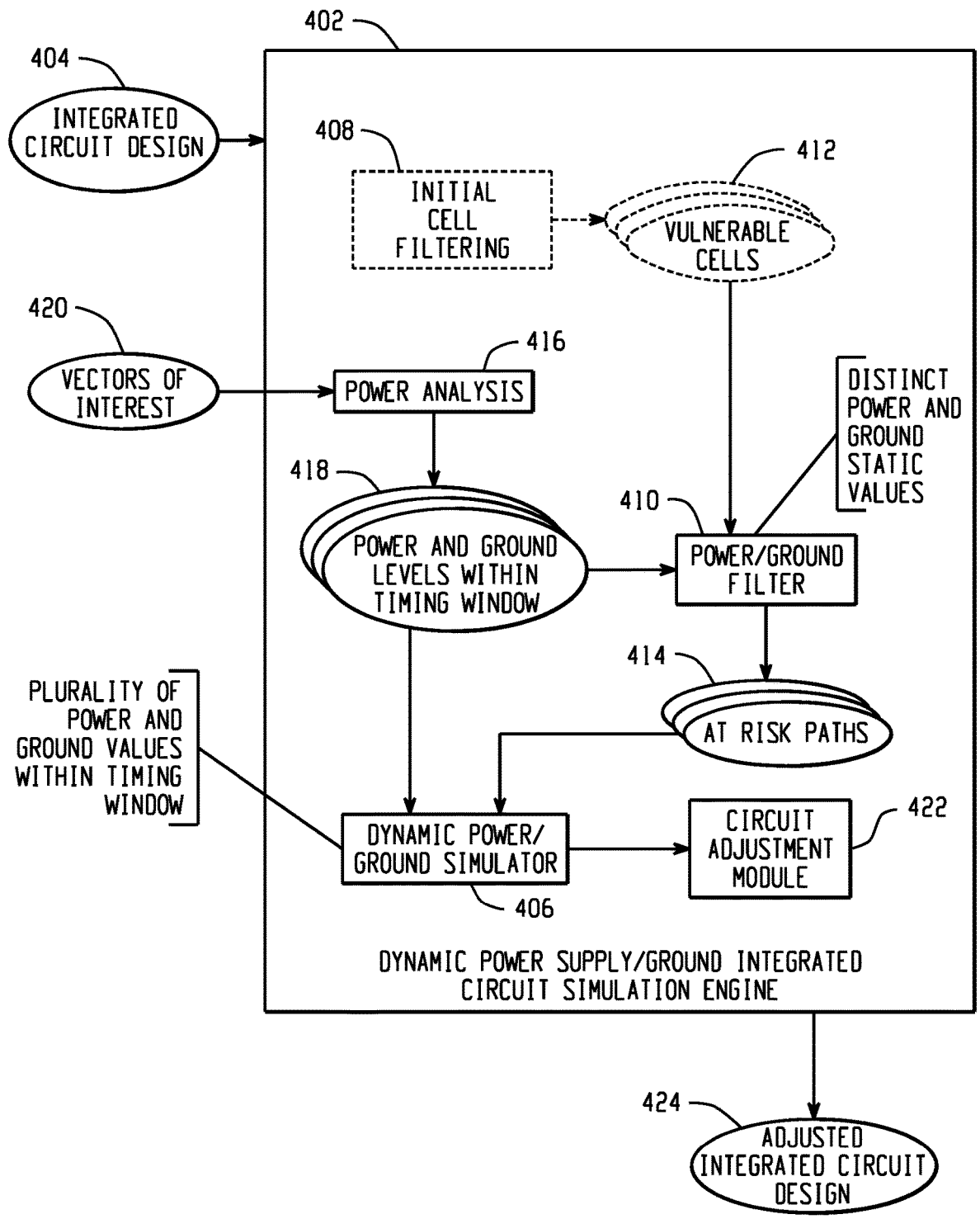
FIG. 4 is a block diagram depicting a processor-implemented method of simulating an integrated circuit.

FIG. 4 is a block diagram depicting a processor-implemented method of simulating an integrated circuit. The dynamic power supply/ground integrated circuit simulation engine 402 determines characteristics of an integrated circuit design 404 based in part on dynamic power/ground simulation performed at 406 (e.g., a DvD simulation). In the example of FIG. 4, dynamic simulation is performed for a portion of the IC design 404 but not its entirety. In the depicted example, one or more levels of filtering 408, 410 are performed to identify cells or groups of cells (e.g., along a particular path of the IC design 404) where dynamic simulation 406 should be performed. For example, the initial layers of filtering 408, 410 may utilize fast IC design techniques like static timing analysis to identify portions of the IC on which to perform dynamic simulation (e.g., portions of the IC design where path slack is near zero, where an improved understanding of timing would be beneficial in making decisions, such as whether to remove buffer cells or otherwise add timing margin).

In the example of FIG. 4, an integrated circuit design 404 is received, the design 404 taking the form of a file representative of an IC layout including a plurality of cells and characteristics of power supply and ground paths to each cell. At 408, an initial layer of filtering is performed to determine a set of one or more vulnerable cells 412. Vulnerable cells 412 are, in one example, IC cells that are either likely to exhibit diminished operation when experiencing non-ideal power supply or ground signals or IC cells that are likely to experience non-ideal power supply or ground signals (e.g., based upon their connection to a "busy" power supply path that supplies power to a significant number of cells that are frequently active). In one embodiment, the initial cell filtering 408 utilizes one or more techniques (e.g., a static timing analysis technique) that utilize ideal power/ground signal levels or simplified power/ground signal levels (e.g., a compressed rail representation of power and ground signals, where a single value representative of a difference between a power supply level and a ground level (e.g., 1.1 V difference) is input to the filtering technique).

Having identified a set of vulnerable cells 412 where diminished performance is possible based on sub-optimal power supply and ground signal levels, a second layer of filtering that uses a more time or resource intensive filtering technique may be applied at 410 to the pool of vulnerable cells 412 to identify most vulnerable cells and their associated at-risk paths 414. Where the first filtering technique 408 utilizes significantly simplified representations of power and/or ground signal levels (e.g., a compressed rail representation) to perform a rough identification of vulnerable cells, the second filtering technique utilizes more precise representations of power supply and ground signal levels to identify the at risk paths 414, where it is mostly likely worthwhile to perform the time and resource intensive dynamic simulation 406. In one embodiment, the second layer filter at 410 applies a circuit analysis technique that utilizes single, distinct values for a power supply level and a ground level for each cell (e.g., a 0.9 V power supply level and a 0.1 V ground level) to identify at risk paths. For example, where traditional static timing analysis techniques models utilize a single fixed number representative of a difference between a power supply level and a ground level (e.g., a technique where a ground level is fixed at 0.0 V and cannot be changed), a modified static timing analysis technique that utilizes a single power supply level and a single ground level for each cell can provided a more accurate analysis of cell behavior (e.g., can identify how that cell would perform when faced with a ground bounce that is likely to occur).

The distinct power supply and ground signal levels used by the second-level filtering at 410 are determined via a power analysis operation performed at 416. In the example, of FIG. 4, the power analysis 416 determines one or more of a power supply waveform and a ground level waveform (e.g., the supply waveform 216 of FIG. 2) for each of a plurality of cells. In one example, that waveform 418 comprises more than one value for the power supply or ground level or both across the timing window (e.g., a number of N samples across the timing window). In the example of FIG. 4, the waveforms 418 are used in multiple places by the simulation engine 402. A single power supply level and a single ground level are extracted from the waveforms, as discussed further below, for use in the second-level filtering at 410. Multiple power supply levels and multiple ground levels (e.g., the entirety of the waveforms represented by the multiple samples) are used for the dynamic simulation technique 406 that considers variations of power supply levels and/or ground levels across a timing window.

In the example of FIG. 4, the power analysis 416 utilizes signal vectors of interest 420 to determine power supply and ground level waveforms 418. Complex IC's will have a multitude of possible combinations of input signals to cells or groups of cells along paths within the IC. Certain of those combinations of input signals may be benign, such that they have little effect on power supply and ground level signals. Other vectors (i.e., combinations of input signals) are substantially more likely to affect power supply and ground level signals. For example, an input vector that will activate many cells connected to a single power supply path may be likely to cause a short-term drop (e.g., droop) in power supply voltage, and an input vector that will activate many cells connected to a single ground level path may be likely to cause a ground bounce effect on the ground path that is experienced by cells connected to that path. A pool of all possible input vectors may be filtered to identify a set of vectors of interest 420 that are most likely to result in sub-optimal power supply and ground level signal behaviors at 418 for use in filtering at 410 and dynamic simulation at 406. In one example, at risk paths 414 are simulated multiple times at 406 using different power supply/ground level waveforms from 418 based on different vectors of interest 420.

As noted above, the entirety of a power supply level waveform and/or a ground level waveform 418 may be utilized at 406 to perform dynamic simulation of a portion of the IC design 404 along an at risk path 414. That dynamic simulation 406 can accurately predict behaviors of individual cells on an at risk path 414 and the entirety of an at risk path 414 (e.g., total path slack) to identify at risk paths that should be adjusted to provide as-designed IC behavior. In one embodiment, the IC simulation engine 402 outputs metrics indicating predicted behaviors of the IC design 404 and its at risk paths 414 as indications of areas where design modification may be worthwhile. In other examples, the simulation engine 402 provides integrated circuit adjustment 422 automatically (e.g., automatically removing one or more buffer cells or otherwise adding margin to provide non-negative path slack) or semi-automatically (e.g., identifying IC portions where adjustment is likely worthwhile based on dynamic simulation results and receiving adjustment commands from an IC designer) to output an adjusted integrated circuit layout 424. Additionally, in some instances, unnecessary margin can be removed, which can provide a number of benefits including reducing power consumption.

Figure 5:
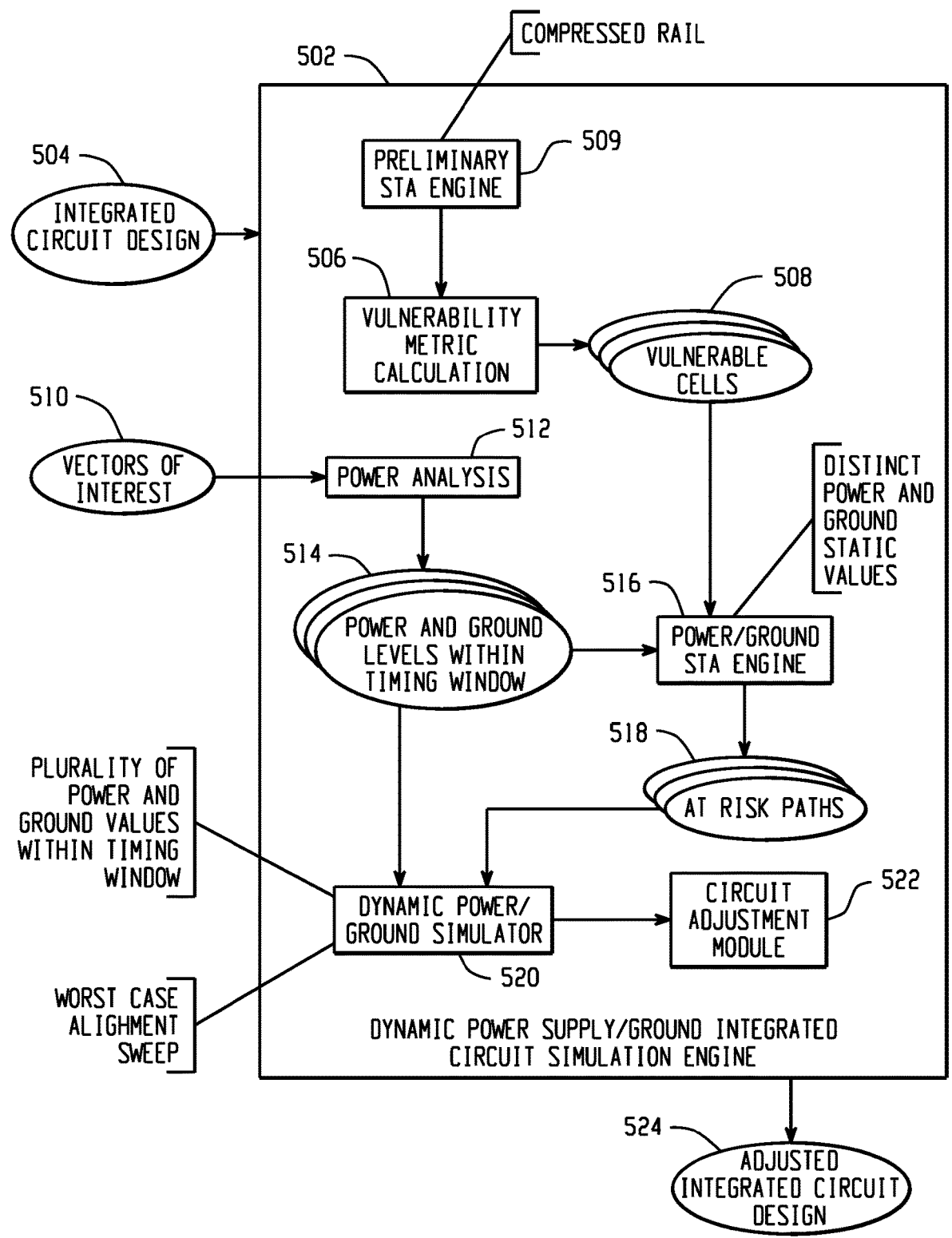
FIG. 5 is a block diagram depicting a dynamic power supply/ground integrated circuit simulation engine that uses static timing analysis technique variants as components of first- and second-level cell filtering for dynamic simulation.

FIG. 5 is a block diagram depicting a dynamic power supply/ground integrated circuit simulation engine that uses static timing analysis technique variants as components of first- and second-level cell filtering for dynamic simulation. The simulation engine 502 receives an integrated circuit design 504. One or more vulnerability metrics are determined at 506 to identify vulnerable cells 508 for further processing. In the example of FIG. 5, a preliminary static timing analysis engine 509 utilizes a compressed rail representation of power supply/ground level values (e.g., a single value representing a difference between a power supply level and a ground level, a single power supply level with a ground level understood to be 0.0 V) to determine one or more vulnerability metrics at 506.

Vectors of interest 510 are used to perform a power analysis at 512 to determine one or more power supply and ground level waveforms 514 for each cell (e.g., each vulnerable cell 508, each cell on an IC path on which a vulnerable cell 508 sits). A single power level and a single ground level from those waveforms 514 are used at 516 to perform a static timing analysis that considers both of those single power level and ground levels to determine circuit and/or path behaviors to identify at risk paths 518. A plurality of power supply and ground level values (e.g., multiple samples) from the waveforms at 514 are used at 520 to perform dynamic simulation to identify operating characteristics of cells of an at risk path 518 or an entirety of an at risk path 518 when experiencing a power supply and ground level waveform 514. In one example, a set of a particular power supply waveform and a particular ground level waveform 514 are dynamically simulated multiple times at 520 to ascertain differences in behavior based on when in a timing window of a cell variations in the waveforms 514 are experienced (e.g., when in a timing window a ground bounce occurs). In some examples, a subset of all possible alignments with a timing window are dynamically simulated at 520 based on a preliminary assessment that identifies and excludes alignments where worst-case cell behavior is certain not to or unlikely to occur. As noted above, one or more operating characteristics (e.g., worst-case operating characteristics for a cell or path) are determined by the dynamic simulation 520, and in some embodiments, the simulation engine 502 provides IC adjustment at 522 to output an adjusted IC layout 524.

The single power level and single ground level selected for use in the power/ground simulation at 516, based on the waveforms at 514, may be selected in a variety of ways. In one example, the single power level is selected as a minimum power level that the power analysis determines will be provided to the vulnerable cell during the timing window, and the single ground level is selected as a maximum ground power level that the power analysis determines will be provided to the vulnerable cell during the timing window. In another example, the single power level and the single ground level are selected by analyzing the plurality of power and ground levels for the vulnerable cell to identify a point in the timing window where a difference between the power level and the ground level for the vulnerable cell are at a minimum, selecting the single power level as the power level for the vulnerable cell determined via the power analysis at the point, and selecting the single ground level as the ground level for the vulnerable cell determined via the power analysis at the point. In a further example, the single power level is selected as a minimum power level for the vulnerable cell determined via the power analysis, and the single ground level is selected as an average ground level for the vulnerable cell over the timing window determined via the power analysis.

Figure 6:
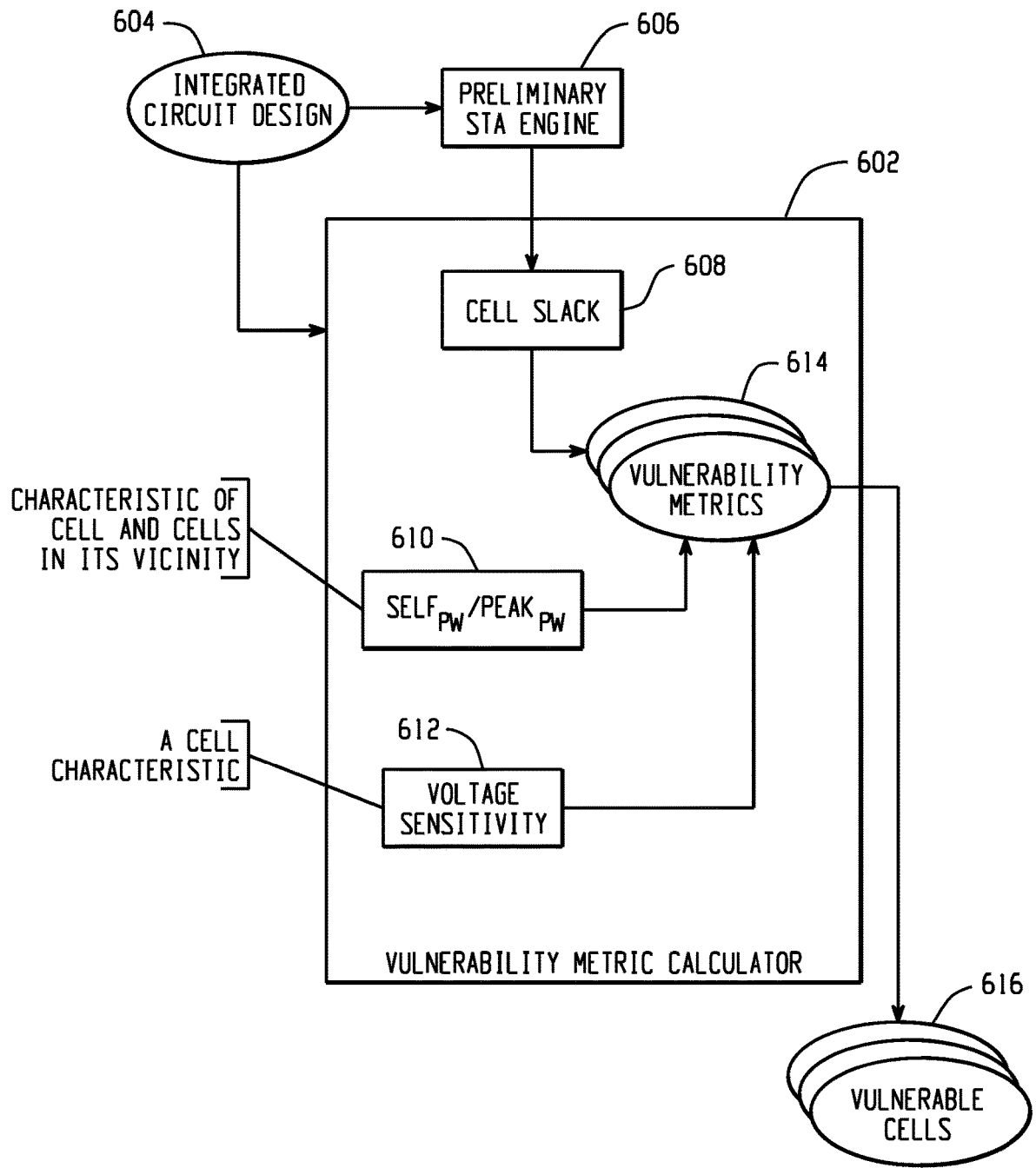
FIG. 6 is a block diagram depicting an example process for determining vulnerability metrics to identify vulnerable cells.

FIG. 6 is a block diagram depicting an example process for determining vulnerability metrics to identify vulnerable cells. A vulnerability metric calculator 602 receives an integrated circuit design 604. A preliminary static timing analysis engine 606 receives the IC design 604 and calculated cell slacks 608 (e.g., using a compressed rail representation of power supply and ground levels). A $Self_{PW}/Peak_{PW}$ metric is calculated at 610 as a metric indicative of a characteristic of an individual cell relative to cells in its vicinity. In one example that metric 610 is calculated based on a maximum (or average) power demand of a particular cell divided by a maximum power demand of cells within a vicinity (e.g., within a threshold distance in the IC design) of the particular cell when all of those cells are active. At 612, a voltage sensitivity metric is calculated for a particular cell as a metric indicative of a characteristic of the particular cell by itself. In one embodiment, the voltage sensitivity metric 612 is calculated as a change in cell operation per change in a power supply or ground level. One or more of the vulnerability metrics 608, 610, 612 are utilized at 614 to identify vulnerable cells 616. For example, a weighted combination of vulnerability metrics 608, 610, 612 is compared to a threshold value on a per-cell basis to identify cells which are considered vulnerable 616.

Figure 7:
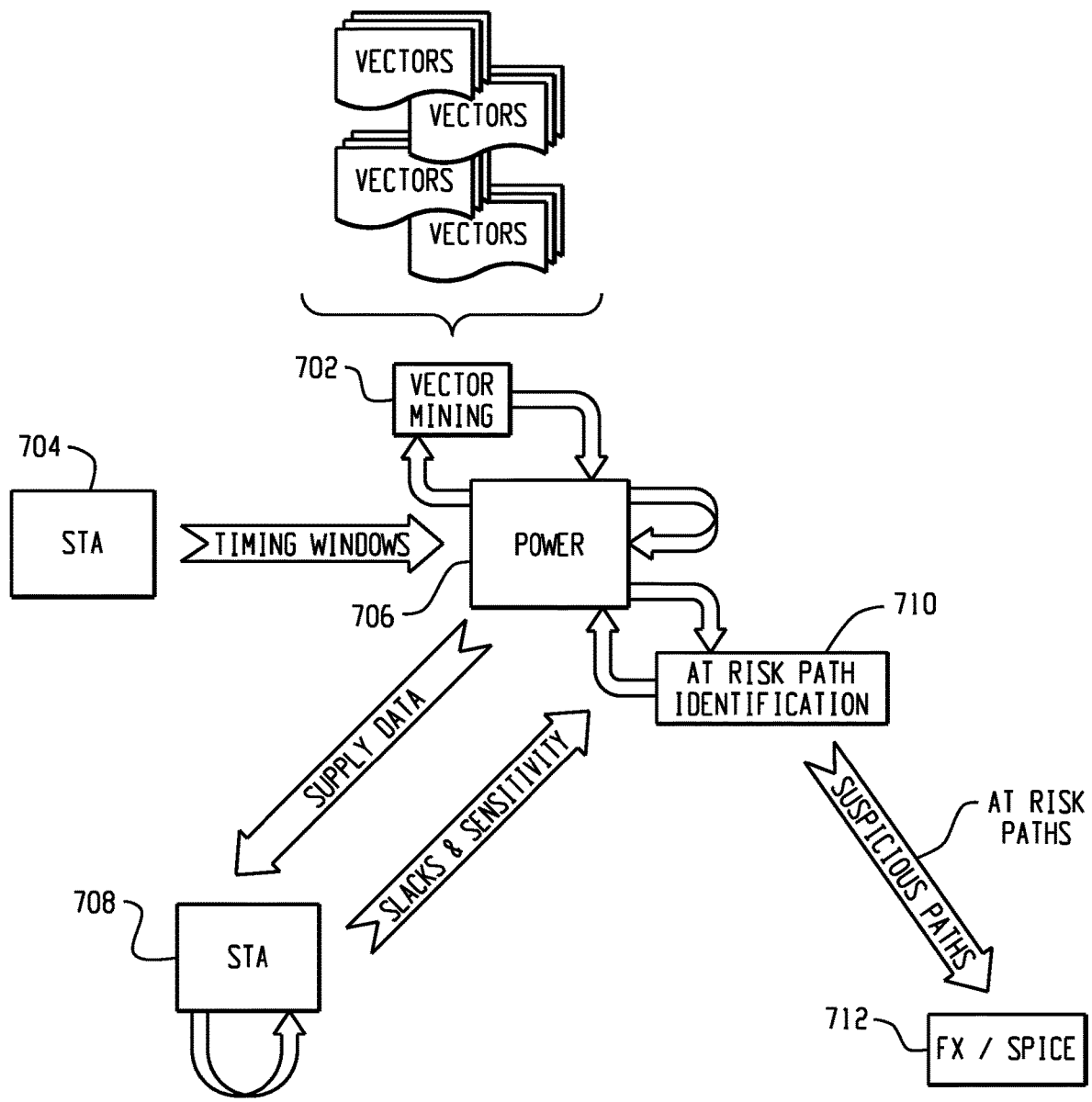
FIG. 7 is a flow diagram depicting a processor-implemented method of simulating an integrated circuit.

FIG. 7 is a flow diagram depicting a processor-implemented method of simulating an integrated circuit. At 702, a vector mining operation is performed to identify input vectors to the IC or portions of an IC (e.g., a particular path, cells of the IC connected to a particular power supply or ground path) that are most likely to induce sub-optimal power supply and ground level signal behaviors. A static timing analysis is performed at 704 to identify timing windows for cells of the IC design, and at 706 a power analysis is performed for one or more cells of the integrated circuit to identify one or more power signal waveforms and/or one or more ground level signal waveforms that each cell will experience for a given input vector. A second static timing analysis is performed at 708 that utilizes single, distinct power supply values and ground level values from the power analysis 706 for each cell to identify slacks and/or voltage sensitivities for those cells that are used to identify at risk paths at 710 for the IC. Dynamic simulation of at risk paths is performed at 712 to identify more accurate characterizations of behaviors of those paths when provided the power supply and/or ground waveforms determined at 706. Those simulation results from 712 can be used to identify areas of the IC design that should be adjusted.

Figure 8:
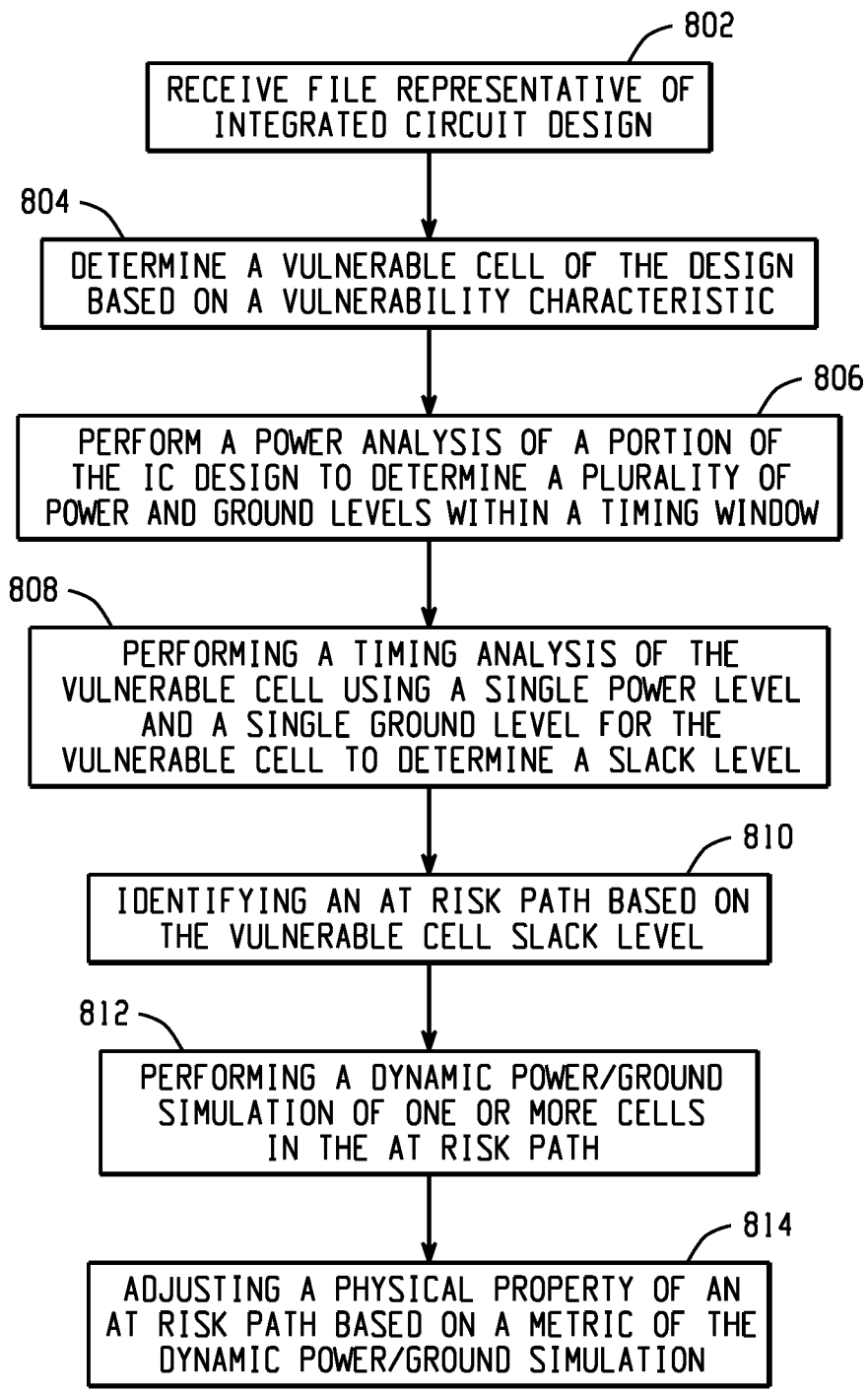
FIG. 8 is a flow diagram depicting a processor-implemented method of simulating an integrated circuit in another embodiment.

FIG. 8 is a flow diagram depicting a processor-implemented method of simulating an integrated circuit. A file representative of an integrated circuit layout is received at 802, the integrated circuit layout including a plurality of cells and characteristics of power supply and ground paths to each cell. A vulnerable cell of the integrated circuit layout is determined at 804 based on a vulnerability characteristic of the vulnerable cell. A power analysis of a portion of the integrated circuit layout is performed at 806 to determine a plurality of power and ground levels within a timing window for each of a plurality of cells including the vulnerable cell. A timing analysis of the vulnerable cell is performed at 808, where the timing analysis receives a single power level and single ground level for the vulnerable cell and determines a slack level for the vulnerable cell. An at risk path is identified based on the vulnerable cell slack level at 810, and a dynamic power/ground simulation of one or more cells in the at risk path is performed at 812. In embodiments, a physical property of an at risk path of the IC layout is adjusted based on a metric of the dynamic power/ground simulation at 814.

Systems and methods as described herein may enable IC design that reduces timing margins via more precise timing determinations using targeted dynamic power supply and ground level simulations. Traditional approaches often miss a number of potentially important physical effects that cause miscorrelation between simulated and actual devices (particularly at geometries at 10 nm and below). Measurements indicate that conventional approaches (e.g., static timing analysis using a compressed rail representation of power supply/ground levels) can have up to a +/−50% error versus full, detailed, dynamic simulation with voltage waveforms on a per-cell basis, and an up to 10% error at the level of individual timing paths. This level of error has caused significant mispredictions of chip performance and caused timing yield failures in a number of instances.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

Figure 9A:
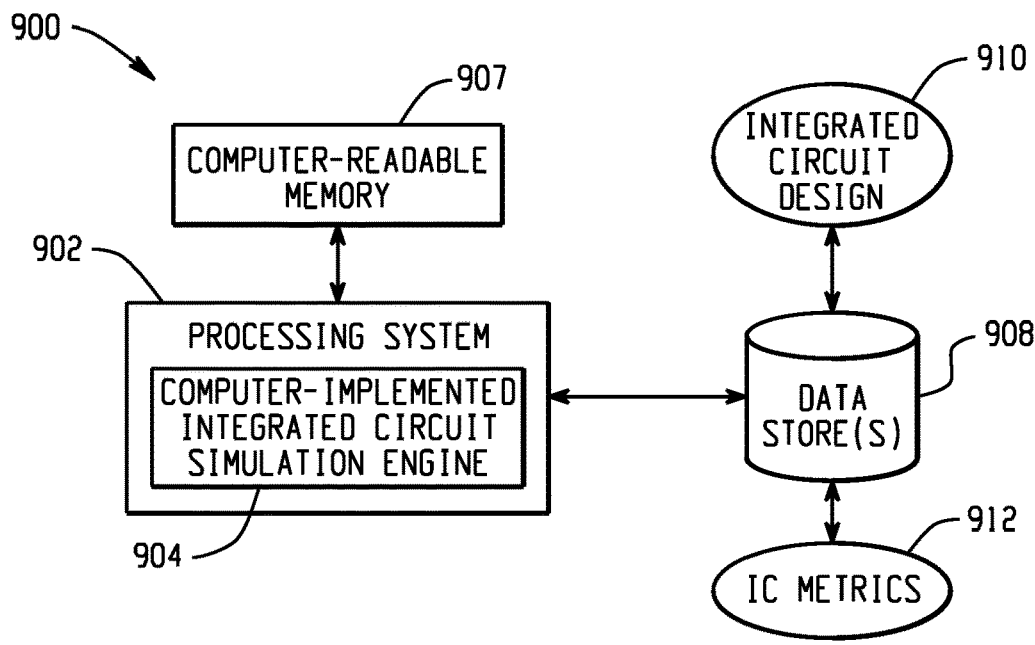
FIGS. 9A, 9B, and 9C depict example systems for implementing the approaches described herein for automatically simulating an integrated circuit.
Figure 9B:
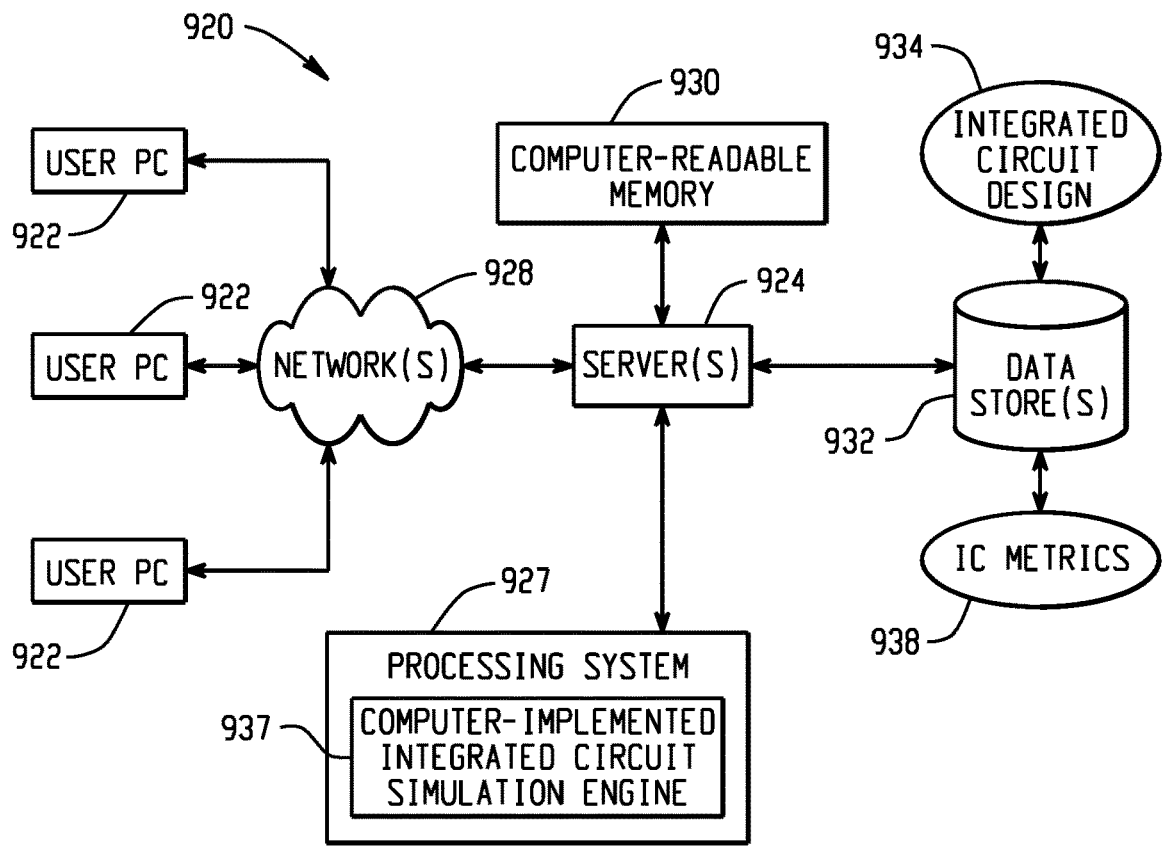
Figure 9C:
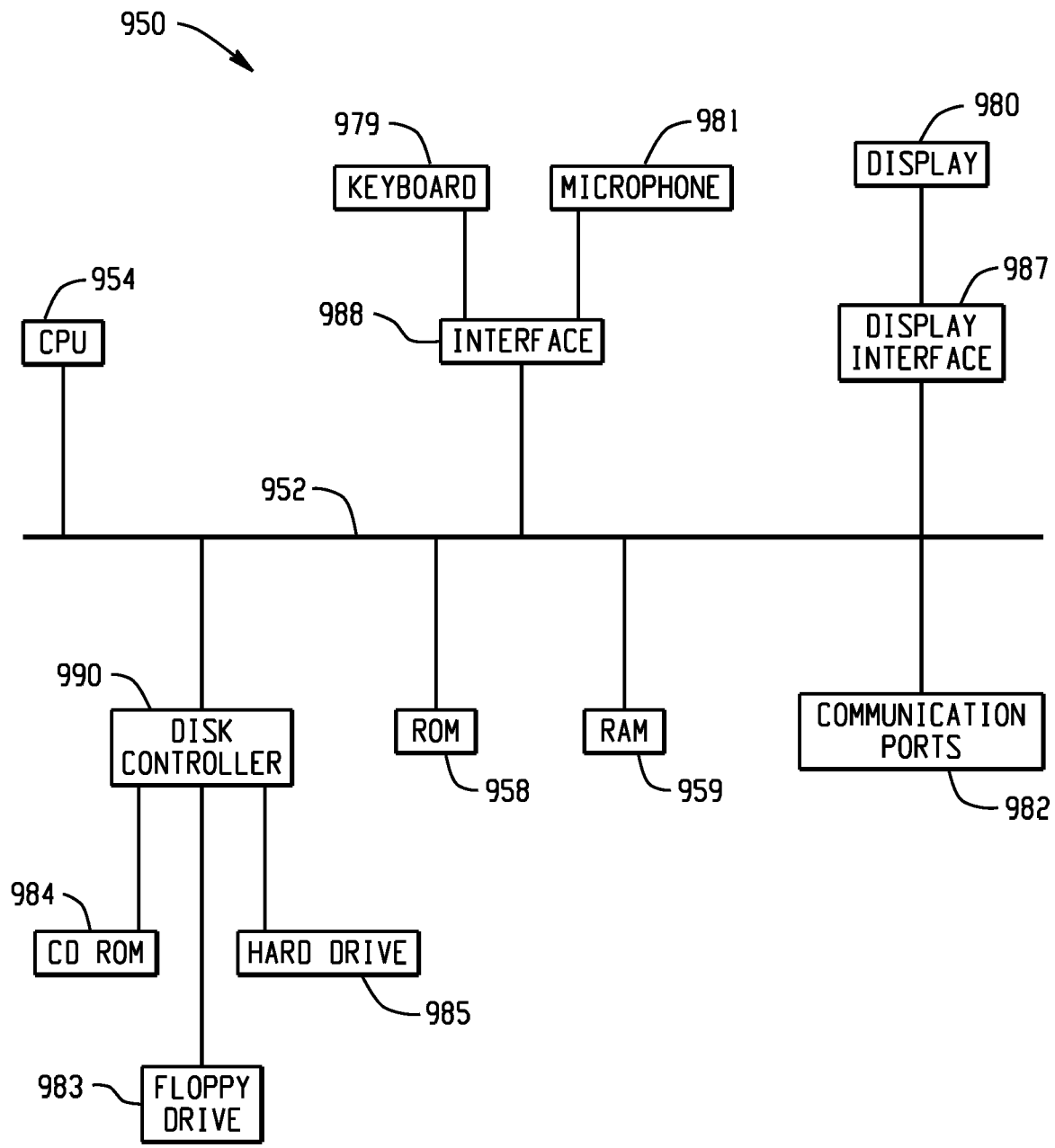

FIGS. 9A, 9B, and 9C depict example systems for implementing the approaches described herein for automatically simulating an integrated circuit. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented integrated circuit simulation engine 904 being executed on the processing system 902. The processing system 902 has access to a computer-readable memory 907 in addition to one or more data stores 908. The one or more data stores 908 may include an integrated circuit design database 910 as well as an IC metric database 912. The processing system 902 may be a distributed parallel computing environment, which may be used to handle very large-scale data sets.

FIG. 9B depicts a system 920 that includes a client-server architecture. One or more user PCs 922 access one or more servers 924 an integrated circuit simulation engine 937 on a processing system 927 via one or more networks 928. The one or more servers 924 may access a computer-readable memory 930 as well as one or more data stores 932. The one or more data stores 932 may include an integrated circuit design database 934 as well as an IC metric database 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of automatically simulating an integrated circuit system. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems for automatically simulating an integrated circuit system. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor-implemented method of simulating an integrated circuit, comprising:
    determining a vulnerable cell of an integrated circuit design including a plurality of cells, the vulnerable cell determined based on a vulnerability metric of the vulnerable cell;
    determining waveforms comprising a plurality of power and ground levels within a timing window for the vulnerable cell;
    determining a slack level for the vulnerable cell based on a single power level and the single ground level extracted from the waveforms;
    identifying an at risk path of the circuit design based on the vulnerable cell slack level;
    performing a dynamic power/ground simulation of one or more cells in the at risk path using the waveforms, wherein a physical property of an at risk path of the integrated circuit design is identified based on a metric of the dynamic power/ground simulation.

2. The method of claim 1, wherein the plurality of power and ground levels are determined based on a static timing analysis.

3. The method of claim 2, wherein the static timing analysis is a modified static timing analysis that utilizes the single power level and the single ground level to determine the slack level of the vulnerable cell.

4. The method of claim 1, wherein the vulnerability metric of the vulnerable cell is based on a metric of the vulnerable cell and a corresponding metric of cells in a vicinity of the vulnerable cell in the integrated circuit design.

5. The method of claim 4, wherein the vulnerability metric is a self-power demand to neighborhood power demand ratio, wherein the ratio is calculated based on activation power demands of the vulnerable cell and the cells in the vicinity of the vulnerable cell.

6. The method of claim 1, wherein the vulnerability metric further comprises a voltage sensitivity metric of the vulnerable cell, wherein the voltage sensitivity indicates a change in cell delay of the vulnerable cell based on a corresponding supply voltage change.

7. The method of claim 1, further comprising:
    performing a preliminary timing analysis for the integrated circuit design to determine the vulnerability metric.

8. The method of claim 7, wherein the preliminary timing analysis is a static timing analysis.

9. The method of claim 8, wherein the preliminary timing analysis receives a compressed rail representation of power and ground, wherein the compressed rail representation comprises a single, static compresses rail value.

10. The method of claim 1, wherein the dynamic power/ground simulation simulates performance of a cell in the at risk path using the plurality of power and ground levels from the power analysis.

11. The method of claim 10, wherein the dynamic power/ground simulation performs a sliding window analysis of the plurality of power and ground levels from the power analysis to identify a worst case alignment of the plurality of power and ground levels for the cell in the at risk path.

12. The method of claim 1, wherein the dynamic power/ground simulation in the at risk path indicates that there is insufficient or negative slack in the at risk path.

13. The method of claim 12, wherein a physical property of one or more cells in the at risk path is adjusted to increase slack in the at risk path.

14. The method of claim 12, wherein a cell is added or removed from the at risk path based on the dynamic power/ground simulation.

15. The method of claim 1, further comprising:
    identifying a plurality of input vectors for testing the integrated circuit design, wherein the plurality of power and ground levels are determined based on one or more of the identified input vectors.

16. The method of claim 15, wherein an input vector is selected based on activation of the vulnerable cell and cells in the vicinity of the vulnerable cell.

17. The method of claim 1, wherein the single power level is selected as a minimum power level for the vulnerable cell.

18. The method of claim 1, wherein the single power level and the single ground level are selected by:
    analyzing the plurality of power and ground levels for the vulnerable cell to identify a point in the timing window where a difference between the power level and the ground level for the vulnerable cell are at a minimum;
    selecting the single power level as the power level for the vulnerable cell determined via the power analysis at the point; and
    selecting the single ground level as the ground level for the vulnerable cell determined via the power analysis at the point.

19. The method of claim 1,
    wherein the single ground level is selected as an average ground level for the vulnerable cell over the timing window.

20. A non-transitory machine readable storage medium storing instructions, which when executed by one or more processors, perform operations comprising:
    determining a vulnerable cell of an integrated circuit design including a plurality of cells, the vulnerable cell determined based on a vulnerability metric of the vulnerable cell;
    determining waveforms comprising a plurality of power and ground levels within a timing window for the vulnerable cell;
    determining a slack level for the vulnerable cell based on a single power level and the single ground level extracted from the waveforms;
    identifying an at risk path of the circuit design based on the vulnerable cell slack level;
    performing a dynamic power/ground simulation of one or more cells in the at risk path using the waveforms, wherein a physical property of an at risk path of the integrated circuit design is identified based on a metric of the dynamic power/ground simulation.

* * * * *